SOAP DISPENSER

Original Filed March 4, 1952 4 Sheets-Sheet 1

INVENTORS
JEROME LIPPMAN &
RAYMOND W. LORENCE
BY William Cleland
ATTORNEY

SOAP DISPENSER

Original Filed March 4, 1952 4 Sheets-Sheet 2

INVENTORS
JEROME LIPPMAN &
BY RAYMOND W. LORENCE
William Cleland
ATTORNEY

SOAP DISPENSER

Original Filed March 4, 1952 4 Sheets-Sheet 3

INVENTORS
JEROME LIPPMAN &
RAYMOND W. LORENCE
BY William Cleland
ATTORNEY

SOAP DISPENSER

Original Filed March 4, 1952 4 Sheets-Sheet 4

INVENTORS
JEROME LIPPMAN &
BY RAYMOND W. LORENCE
William Oleland
ATTORNEY

United States Patent Office

Re. 24,312
Reissued May 7, 1957

24,312

SOAP DISPENSER

Jerome Lippman and Raymond W. Lorence, Akron, Ohio, assignors of one-half to Jerome Lippman and one-half to Aaron H. Lippman Original No. 2,700,490, dated January 25, 1955, Serial No. 274,713, March 4, 1952. Application for reissue October 1, 1956, Serial No. 613,358

16 Claims. (Cl. 222—181)

Matter enclosed in heavy brackets [ ] appears in the original patent but forms no part of this reissue specification; matter printed in italics indicates the additions made by reissue.

This invention relates to soap or like dispensers and in particular relates to a machine for dispensing paste-type soap.

One object of the present invention is to provide a machine for dispensing paste-type material, such as hand soap, including simple, efficient means for quickly replaceably mounting containers of the material in the machine as a part thereof.

Another object of the invention is to provide a leak-proof paste-type dispenser of the character described which is substantially fool-proof to dispense accurately predetermined amounts of the material.

Another object of the invention is to provide a dispenser of the character described, including simple, effective means for varying the predetermined amounts of the dispensed material.

Still another object is to provide an improved dispenser including a screw-pressure operated piston having means self-operating as pressure is applied to paste in the dispenser to prevent rotation of the piston.

Other objects of the invention will be manifest from the following brief description and the accompanying drawings.

Figure 1:
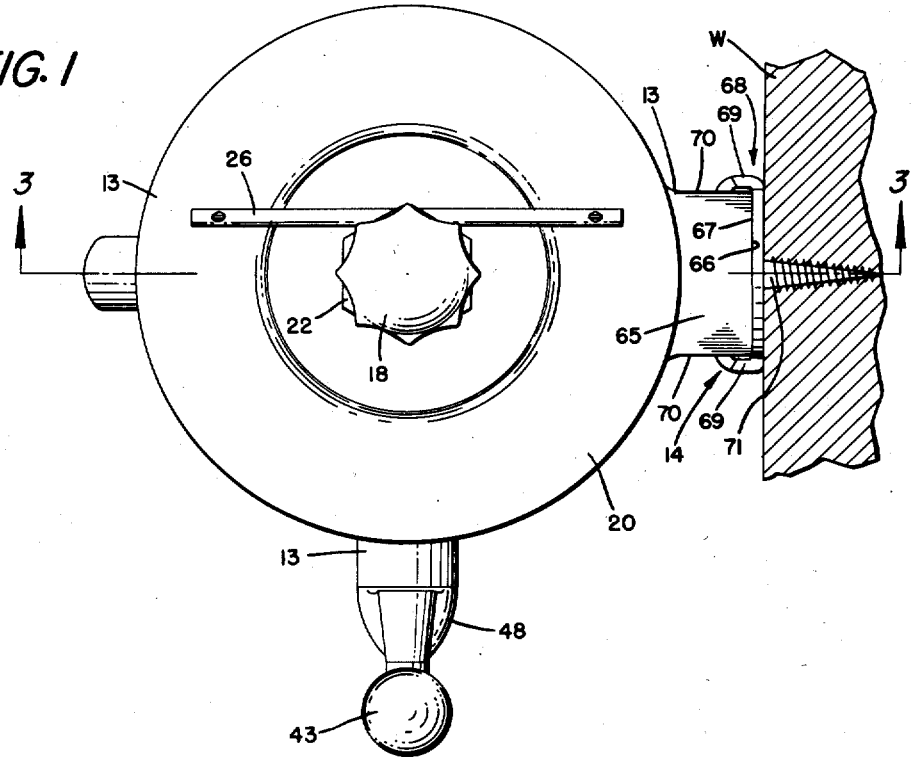
Figure 1 is a top plan view of a soap dispenser embodying the features of the invention, attached to a wall.

Referring to the drawings, generally, there is shown a soap dispensing machine embodying the features of the invention, wherein the numeral 10 designates a cylindrical container of paste or liquid soap S, having one open end clamped in sealing relation against a gasket 11 in an annular recessed seat portion 12 in a hollow base 13, said base being removably secured to a wall or other structure to support the container in upright position by attaching means 14 to be described later.

For removably clamping the container 10 to the hollow base 13, a rigid shaft 15 is threaded at its lower end into a boss 16 in the bottom of the base to extend vertically upward, and a neck portion 17 of a turning member 18 is threaded onto the upper end of shaft 15, said neck portion being rotatably retained through a central aperture 19 in a closure cap 20 having a recessed annular seat 21 in which the open upper end of container 10 is received. Clamping pressure is applied by manually turning a nut 22, on a threaded portion 23 of member 18, against the outer side of the cap. Member 18 is retained on the cap by a spring collar 24 embacing a grooved portion 25 of neck 17 inwardly of the cap. A rod 26 slidably received through a corner portion of nut 22 facilitates application of requisite clamping pressure as described.

Valve means 28 is provided for extruding predetermined amounts of soap S (Figure 3) through an extrusion orifice 29 onto the hand of a user of the machine, in synchronism with manual operation of a control mechanism 30 applying pressure to a piston 31 slidably received in the container 10.

Figure 5:
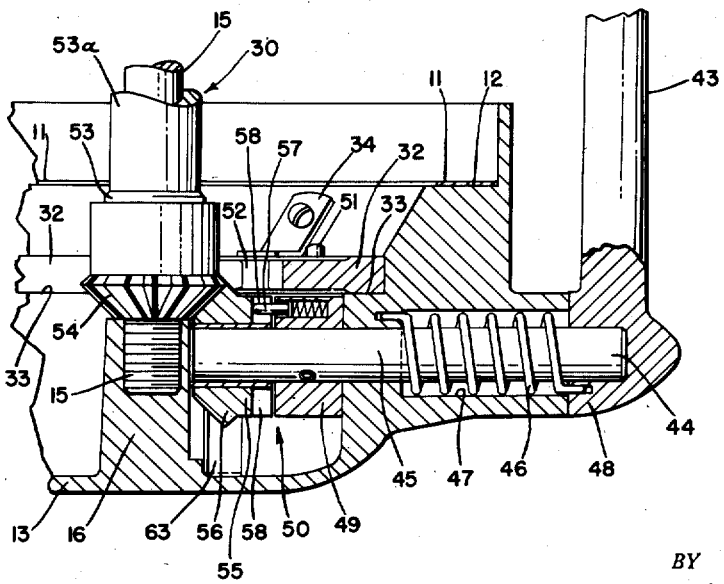
Figure 5 is a vertical cross-section, partly broken away, and on the same scale, taken substantially on the line 5—5 of Figure 4.
Figure 3:
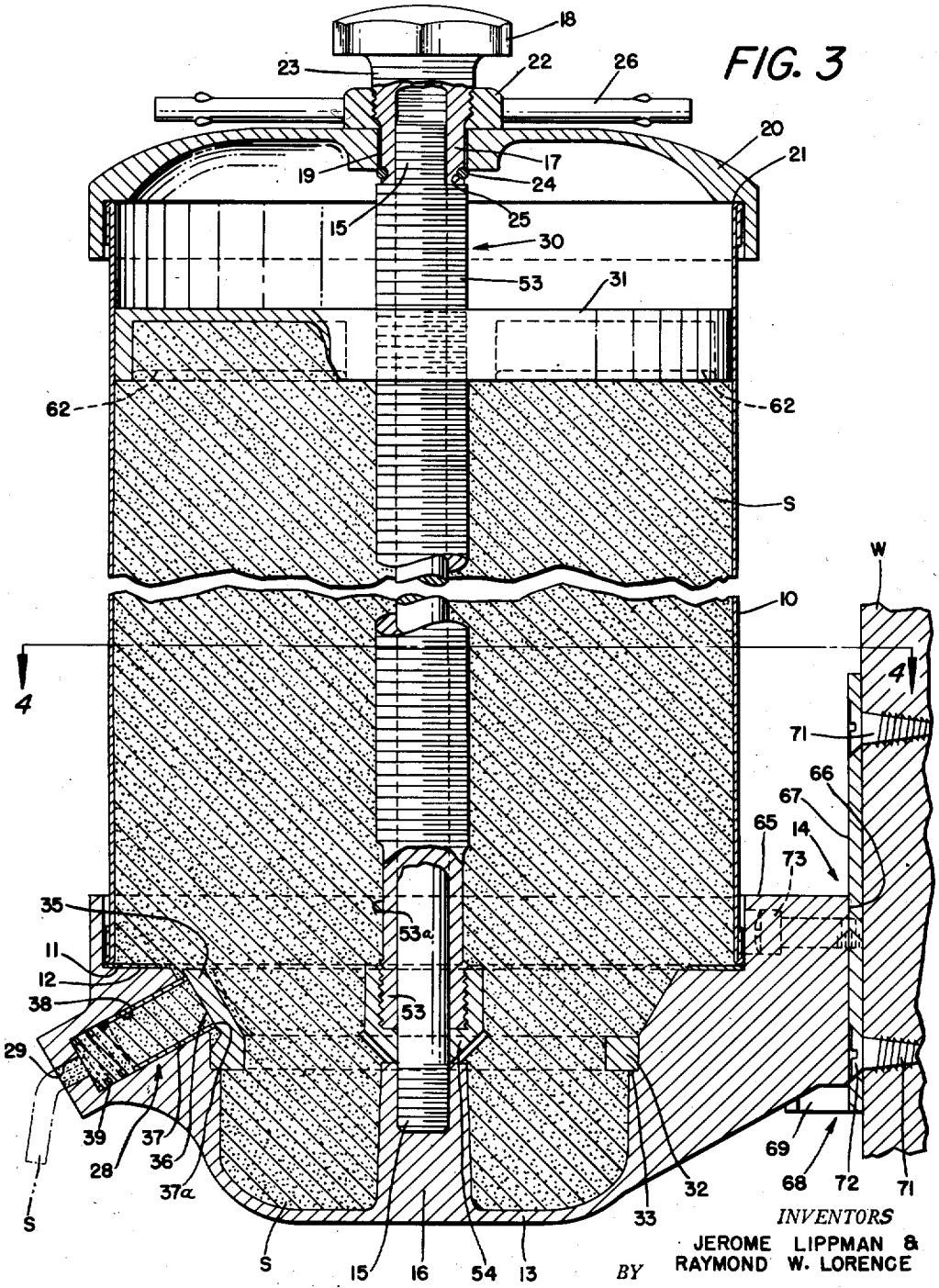
Figure 3 is an enlarged vertical cross-section, partly broken away, taken substantially on the line 3—3 of Figure 1, and showing the dispenser filled and ready for operation.
Figure 4:
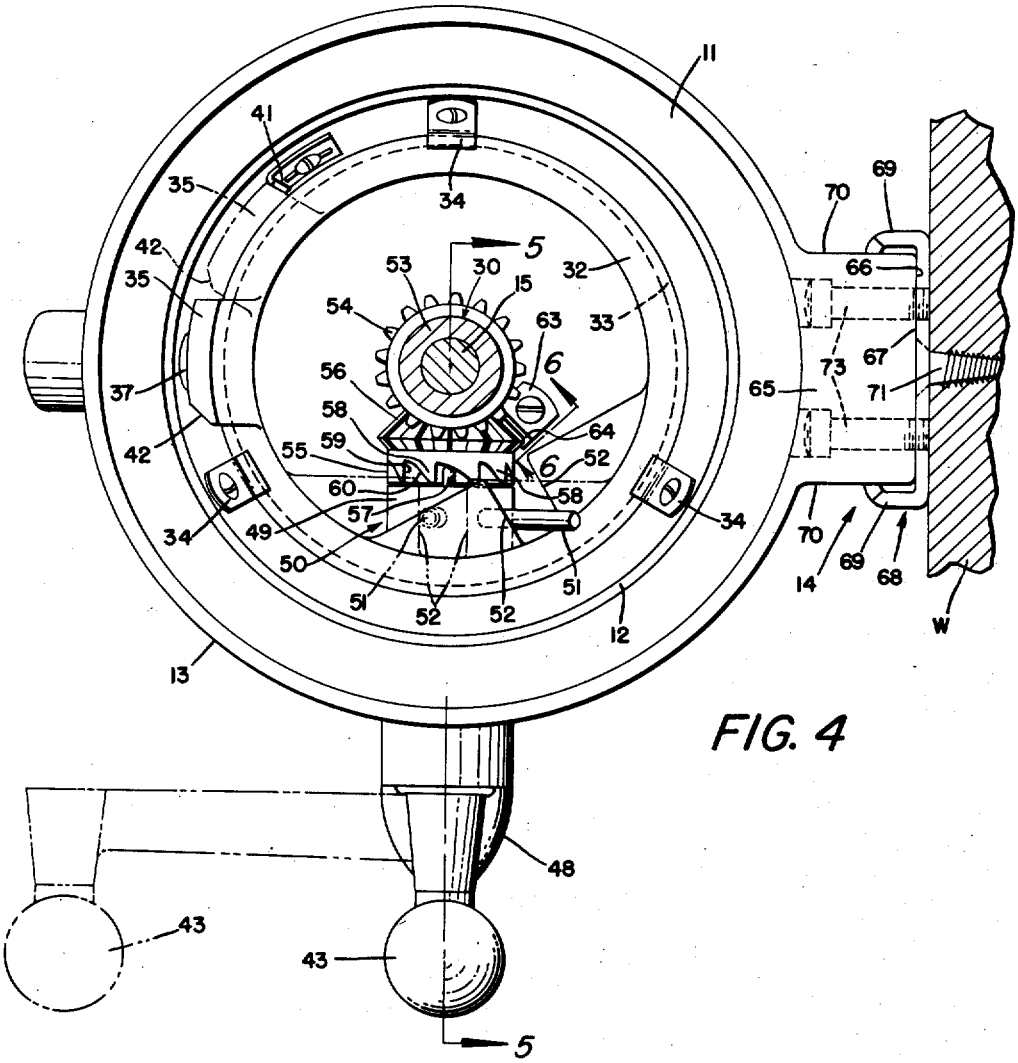
Figure 4 is a horizontal cross-section taken substantially on the line 4—4 of Figure 3, on the same scale, but with the portions including the soap container removed and with the soap removed from the base.

As best shown in Figures 3, 4 and 5, the valve means may comprise a ring 32 rotatably retained in an annular seat 33 in hollow base 13, as by removable clips 34, 34 on the base, said ring having thereon an integral, upwardly protruding valve plate 35, an outwardly presented face 36 of which normally seats in sealing relation against a projecting rim portion 37a of a tubular sleeve 37, slidably received in a bore 38 in the base communicating with said extrusion orifice, sealing pressure of the plate 35 applied to said rim portion being against the yielding action of a compression spring 39 extended between the inner end of the sleeve and the inner end of said bore. The ring is rotatable a small fraction of a revolution to move the valve plate 35 out of yielding seating relation with tube 37, from the full line position shown in Figures 3 and 4 to the chain-dotted line position of Figure 4, as limited by engagement of the leading edge of the plate with a stop clip 41 circumferentially adjustably secured to the base. The trailing edge of the plate 35 is chamfered as indicated at 42 in Figure 4, to facilitate smooth return thereof to said seating engagement with the inner rim or seat 37a of tube 37.

Figure 2:
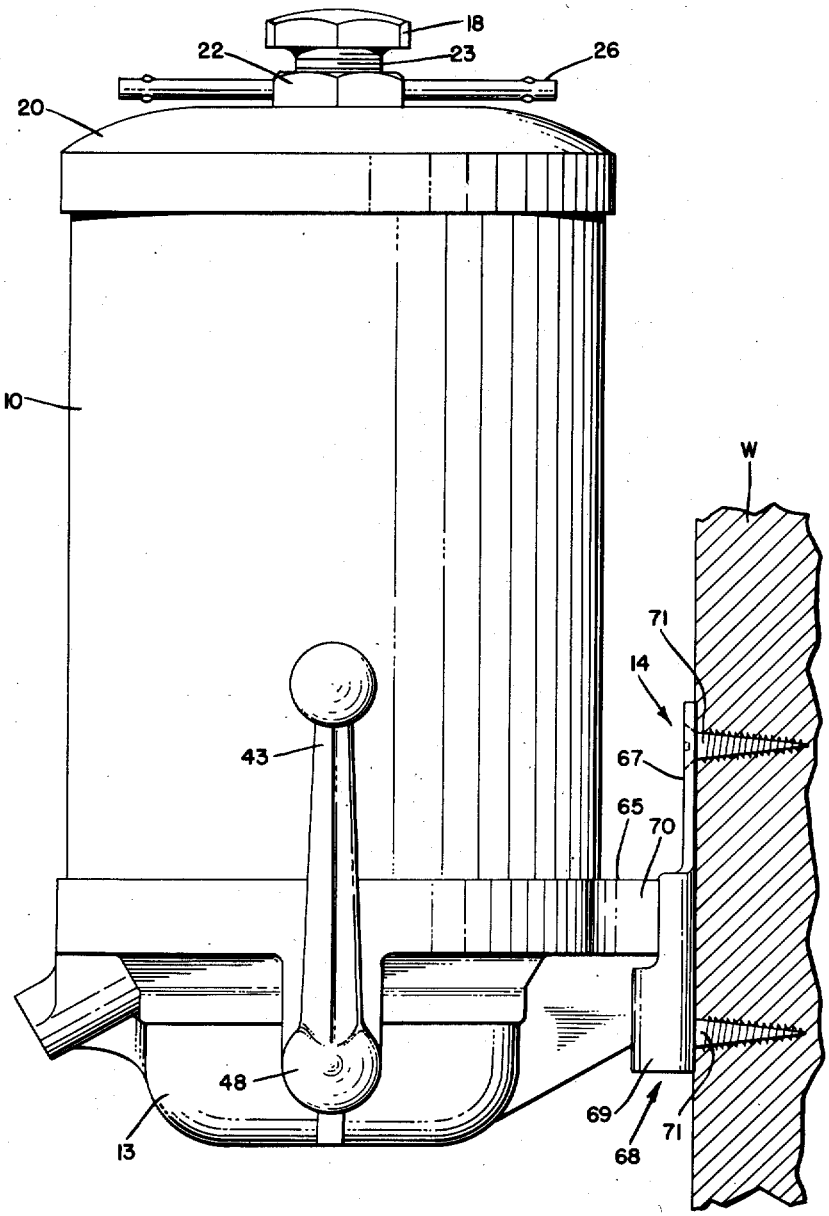
Figure 2 is a side elevation thereof as viewed from the front of Figure 1.

The ring 32 may be yieldingly turned said partial revolution as by turning a handle 43 fixed on an outward extension 44 of a stem 45 journalled through the base 13, such turning action being against the yielding resistance of a coil spring 46 within a bore 47 surrounding the stem and having opposite ends suitably anchored in the hub 48 of the handle and the base 13 at the inner end of the bore, respectively (see Figures 4 and 5). A clutch part 49 of a clutch 50 is keyed on the stem 45 and serves as a collar retaining the stem against axial movement with respect to the base, and this clutch part has a protuberance or pin 51 extending upwardly therefrom at an angle to the axis of the stem to position between circumferentially spaced shoulder portions or lugs 52, 52 extending inwardly from the ring in the plane thereof. The arrangement is such that by swinging the handle forwardly approximately ninety degrees to the left as viewed in Figure 2, and as indicated in full and chain-dotted lines in Figure 4, the ring 32 is turned in clockwise direction to said stop position in which the valve is fully open, whereby pressure applied to the paste S in the container forces a predetermined amount of paste outwardly through the tube 37 and extrusion orifice 29 into the hand of the user or operator of the machine. Release of the handle at the stop or valve-opened position permits the handle spring 46 to swing pin 51 back to starting position and thereby return the ring 32 back to the normal full-line, valve-closed position shown in Figure 4, in which pin 51 prevents further spring-wound rotation of stem 45 by the pin engaging downwardly against the inner edge of the ring. Thus, the pin 51 acts as a positive stop for the normal position of the valve ring and associated movable parts.

For applying predetermined pressure to the paste S simultaneously with opening of the valve 28, the piston 31 is threaded on a sleeve 53 rotatably received on the fixed shaft 15, and retained against axial movement by the upper end of the sleeve engaging the inner end of neck portion 17 *of turning member 18* (*see Figure 3*) and the opposite end of a bevel gear 54, secured to corresponding end of the sleeve, engaging the inner end of boss 16. *Thus, the turning member 18 serves a double purpose, namely for retaining the sleeve against axial movement on the shaft, and for applying clamping pressure to the container 10 through cap 20. It is inherent within the structure of the dispenser, however, that even if cap 20 is omitted the pressure forces set up in the paste body S alone are sufficient to hold the container firmly against the seat portion 12.* Said rotation of sleeve 53 is accomplished by rotation of stem [49] *45*, through one-way clutch 50, a clutch part 55 of which is rotatably mounted on said stem and includes as an integral part thereof a bevel gear 56 in constant mesh with gear 54. Clutch part 49 (fixed on the stem) has a spring-pressed detent 57 extended in the path of a series of peripherally spaced, V-shaped teeth 58 on the outer end of clutch part 55, the teeth having straight faces 59 engageable by the detent in one direction of rotation of member 49, and inclined faces 60 for yieldingly depressing the detent in the opposite direction of rotation of member 49. Thus, upon turning handle 43, yieldingly to rotate stem 45 a fraction of a revolution to open the valve 28, as described above, the clutch 50 is engaged to rotate gear 54 and sleeve 53 approximately one-seventh of a revolution, and because the piston 31 is held against rotation by engagement of the same with the top of the paste S, the piston is *by screw action between the same and the sleeve* moved downwardly a distance sufficient to force a predetermined quantity of paste through the extrusion orifice 29.

A portion 53a of the sleeve 53 at the lower end thereof is relieved or unthreaded to receive the piston 31 freely at the end of its stroke, to avoid continued screw pressure which would damage the dispenser.

To assure that downward pressure on the paste S will prevent rotation of the piston 31 on the threaded portion of sleeve 53, the piston is made cup-shaped, and has circumferentially spaced radial ribs 62 on the underside adapted to embed in the paste, as shown in Figure 3.

Figure 6:
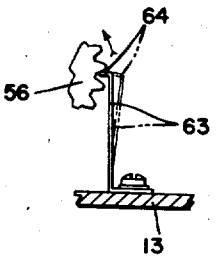
Figure 6 is a fragmentary cross-section taken substantially on the line 6—6 of Figure 4, and illustrating ratchet means for preventing rotation of a portion of the mechanism in one direction.

Release of handle 43 allowing spring 46 to return the movable parts of valve means 28 and of clutch 50 to normal positions thereof may, by frictional resistance in the clutch, tend to reverse the rotation of gear 54 and thereby tend to move the piston 31 up to a certain extent, which would affect the accuracy of the pressure applying means. To obviate this difficulty Figures 4 and 6 show a leaf spring 63 extending upright from the bottom of base 13 and having an inturned lip 64 engaging between two adjacent teeth of bevel gear 56. The spring 63 serves as a ratchet which passes over the teeth of gear 56 upon forward motion thereof, but engages between two adjacent teeth to prevent reverse rotation of the gear.

As shown in Figures 1, 2, 3 and 4 the dispenser attaching means 14 may include a rearward projection 65 of base 13 providing a flat face 66 against which a wall 67 of a channel-shaped bracket 68 fits flatly with opposite side flanges 69 embracing opposite side portions 70 of said rearward projection. The bracket is secured to a wall or other structure W, as by means of screws 71, 71 received through apertures in the bracket wall, at least one of these screws having its head 72 concealed by the abutting portion of the base projection 65. Base 13 is removably attached to the bracket 68, after it is attached to wall W, as by screws 73, 73 received through apertures in the base 13, from the interior thereof, and threaded into the bracket wall 67. Thus, the dispenser can only be removed from wall W by removal of the cap 20, receptacle 10 and any material S which may be in the dispenser.

For a cycle *of* operation of the improved machine to dispense paste-type hand soap S, for example, it is only necessary for the operator, standing in front of the machine, to turn the handle 43 a quarter turn forwardly, with one hand, while cupping the other hand under the extrusion orifice 29, and then releasing the handle immediately upon the same reaching a positive stop, that is, by the valve plate 35 engaging stop clip 41 (see Figure 4), thereby allowing the spring 46 to return the valving and pressure-applying parts to the normal positions thereof. Said forward movement of the handle is effective by rearward swinging movement of pin 51, engaging the rearmost lug 52, to rotate ring 32 and move the valve plate 35 out of yielding sealing engagement with the tube 37, that is from the full line position shown in Figures 3 and 4 to the chain-dotted position shown in Figure 4. Simultaneously with opening of valve 28, the clutch 50 is actuated to turn gear 56 (Figures 4 and 5) and meshing gear 54, and by consequent rotation of the threaded sleeve 53 to apply a downward screw force to the non-rotatable piston 31, the slight downward movement of the piston being sufficient to eject a predeterminately small amount of the soap S into the cupped hand (see chain-dotted lines in Figure 3). Conversely, said spring-pressed return movement of the handle is effective to swing pin 51 rearwardly to move the valve plate 35 into engagement with the seat portion 37a of tube 37, the spring-pressure of said tube against said plate assuring a complete seal against leakage of soap due to residual pressure in the container of soap S. Because the one-way clutch 50 is effective only in forward direction of operation, the sleeve 53 is turned in pressure-applying direction only and hence repeated operation of the dispenser is effective to move the piston steadily downward until it reaches the unthreaded portion 62 of the sleeve.

When the container 10 is empty it is only necessary to remove the cap 22 and piston 31, and after replacing the empty container with a full one from which covers (not shown) have been removed from both ends (see Figure 3), replacing the piston on the sleeve and clamping the cover 20 on the upper end of the full container, as described above. This replaceable feature greatly facilitates convenient and economical maintenance of soap supply to dispensers in garages, service stations, machine shops and the like, because the containers in which the soap is shipped or stored become integral parts of the dispensers.

Modifications of the invention may be resorted to without departing from the spirit thereof or the scope of the appended claims.

What is claimed is:

1. A soap or like dispenser, comprising a relatively fixed part having an extrusion opening from an inner portion thereof to the exterior, valve means in said part including a peripheral seat at the inner end of said opening and an annular element rotatably mounted on said relatively fixed part, said element having a closure member rotatable therewith from and toward closed complemental seating position on the seat, control means for rotating said element and closure member to open and close said valve, a paste container mounted on said part and having its interior in communication with said inner end of said extrusion opening to supply paste therefrom to said valve means, and means operable by said control means in synchronism with operation of said valve means for forcing paste from the container toward said extrusion opening, said valve opening including a recess opening inwardly of said part and terminating outwardly in an outer extrusion orifice, and a depressible spring-pressed tubular element in said recess, said valve seat being a freely protruding rim of said tubular element at the inner end thereof against which said closure member normally seats in yielding sealing relation, said annular element providing free passage therethrough of paste from said container to said valve means.

2. A soap or like paste dispenser, comprising a relatively fixed base having a seat portion, a shaft fixed to said base to extend axially outwardly of said seat portion, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means operable to rotate said sleeve progressively in one direction and thereby by screw action [on said shaft] *between said sleeve and said piston* progressively move said piston axially against the paste to apply pressure thereto, said base having a wall portion provided with an extrusion opening extending from the interior to the exterior thereof, and valve means synchronized with operation of said control means to open said extrusion opening for a predetermined length of time to dispense paste from the container, said sleeve having an unthreaded reducted portion at the inner end thereof adjacent said seat portion in which reduced portion said piston is freely rotatable at the inner end of the stroke thereof.

3. A soap or like paste dispenser, comprising a base having a seat portion, a shaft fixed to said base to extend outwardly of said seat, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means manually operable to rotate said sleeve progressively in one direction and thereby by screw action [on said shaft] *between said sleeve and said piston* progressively move said piston axially against the paste to apply pressure thereto, and valve means synchronized with operation of said control means to open for a predetermined length of time to dispense paste from the container, said control means comprising a stem rotatably mounted in said base, an operating handle mounted on said stem outwardly of said base, a one-direction clutch having a part in said base rotatable with said stem and a part rotatable independently thereof in operatively disengaged condition of the clutch parts, driving means between said independently rotatable part and said sleeve for rotating the sleeve on said shaft, movement of said handle in said one-direction thereby engaging said clutch parts to rotate said sleeve through said driving means.

4. A soap or like dispenser as set forth in claim 3, said control means including stop means for limiting the stroke of said handle from a normal inoperative position thereof, and spring means for returning said handle to said normal position.

5. A soap or like dispenser as set forth in claim 4, said stop means being adjustable to vary said stroke and thereby vary the amount of paste dispensed.

6. A soap or like paste dispenser, comprising a base having a seat portion, a shaft fixed to said base to extend outwardly of said seat, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means operable to rotate said sleeve progressively in one direction and thereby by screw action [on said shaft] *between said sleeve and said piston* progressively move said piston axially against the paste to apply pressure thereto, and valve means synchronized with operation of said control means to open for a predetermined length of time to dispense paste from the container, said clamping means comprising a turning member having a neck portion rotatably extended through said cap and adjustably threaded onto the outer end of said shaft, the inner end of said neck portion providing a stop shoulder retaining said sleeve against outward axial movement thereof on the shaft, said turning member having a nut threaded thereon to apply clamping pressure inwardly against the cap.

7. A soap or like paste dispenser, comprising a base having a seat portion, a shaft fixed to said base to extend outwardly of said seat, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means operable to rotate said sleeve progressively in one direction and thereby by screw action [on said shaft] *between said sleeve and said piston* progressively move said piston axially against the paste to apply pressure thereto, and valve means synchronized with operation of said control means to open for a predetermined length of time to dispense paste from the container, said clamping means comprising a turning member having a neck portion rotatably extended through said cap and adjustably threaded onto the outer end of said shaft, the inner end of said neck portion providing a stop shoulder retaining said sleeve against outward axial movement thereof on the shaft, said turning member having a nut threaded thereon to apply clamping pressure inwardly against the cap, the inner end of said neck portion extending through said cap and having means thereon for retaining the turning member on the cap.

8. A soap or like paste dispenser, comprising a base having a seat portion, a shaft fixed to said base to extend outwardly of said seat, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means operable to rotate said sleeve progressively in one direction and thereby by screw action [on said shaft] *between said sleeve and said piston* progressively move said piston axially against the paste to apply pressure thereto, and valve means synchronized with operation of said control means to open for a predetermined length of time to dispense paste from the container, said valve means comprising an extrusion orifice, a valve seat at the inner end of said orifice, an annulus rotatably mounted in said base and having a closure element normally seating on said seat, spaced shoulder portions on said annulus, a protrusion also movable by said control means and engaging between said shoulder portions, movement of said protrusion by said control means thereby rotating said annulus in synchronism with said axial movement of the piston to rotate said annulus and correspondingly to move said closure element from and toward said seating position on said valve seat.

9. A soap or like paste dispenser, comprising a base having a seat portion, a shaft fixed to said base to extend outwardly of said seat, a sleeve rotatably received on said shaft, a container for the paste having an open end received in said seat, a cap having a seat portion receiving the other end of said container, clamping means connected to the outer end of said shaft including a member adjustable against said cap to clamp the container between the cap and said base, a piston threaded on said sleeve to be slidable within the container and adapted to be held against rotation therein by pressure against paste in the container, control means manually operable to rotate said sleeve progressively in one direction and thereby by screw action [on said shaft] *between said sleeve and said piston* progressively move said piston axially against the paste to apply pressure thereto, and valve means synchronized with operation of said control means to open for a predetermined length of time to dispense paste from the container, said control means comprising a stem rotatably mounted in said base, an operating handle mounted on said stem outwardly of said base, a one-direction clutch having a part in said base rotatable with said stem and a part rotatable independently thereof in disengaged condition of the clutch parts, driving means between said independently rotatable part and said sleeve for rotating the sleeve on said shaft, movement of said handle in said one-direction thereby engaging said clutch parts to rotate said sleeve through said driving means, said valve means comprising an extrusion orifice, a valve seat at the inner end of said orifice, an annulus rotatably mounted in said base and having a closure element normally seating on said seat, spaced shoulder portions on said ring, a protrusion movable with rotation of said stem and engaging between said shoulder portions, movement of said protrusion upon turning said handle operating in synchronism with said axial movement of the piston to rotate said annulus and correspondingly move said closure element from and toward said seating position on the seat.

10. A soap or like paste dispenser, comprising a relatively fixed base having an upwardly presented peripheral seat portion, a container for the paste having an opening at one end, means for releasably securing said container with said one end thereof downwardly seated on said seat portion of the base, pressure means operable against paste in said container, control means for actuating said pressure means progressively to apply pressure to the paste, said base having a wall portion provided with an extrusion opening extending from the interior to the exterior of the base, valve means in said base including a seat at the inner end of said extrusion opening and an element continuously in contact with and movable relative to the base by operation of said control means when said pressure is applied, said element having a closure member movable therewith from and toward closed complemental seating position on said seat, said element being movable by operation of said control means in synchronism with application of said pressure to the paste to move said closure member from said seat for a predetermined length of time to dispense paste from the container.

11. A soap or like paste dispenser, comprising a relatively fixed base having a seat portion, a shaft fixed to said base to extend outwardly of said seat, a sleeve rotatably received on said shaft, a container for the paste having an opening at one end, said one end of the container being received in said seat, a cap having a seat portion receiving the other end of said container, clamping means connected to the outer end of said shaft and including a member adjustable against said cap to clamp the container between the cap and said base, a piston threaded on said sleeve to be slidable within the container and adapted to be held against rotation therein as by pressure against paste in the container, control means operable to rotate said sleeve progressively in one direction and thereby by screw action [on said shaft] *between said sleeve and said piston* progressively move said piston axially against the paste to apply pressure thereto, said base having an extrustion opening from an inner portion thereof to the exterior, valve means in said base including a seat at the inner end of said extrusion opening and an element shiftably mounted on said base, said element having a closure member shiftable therewith from and toward closed complemental seating position on said extrusion opening seat, said element being shiftable by operation of said control means in synchronism with said axial movement of said piston to move said closure member from said seat for a predetermined length of time to dispense paste from the container.

12. A soap or like material dispenser, comprising a relatively fixed base and a separate cap having opposed peripheral seat portions, said base and cap being adapted to have opposite peripheral ends of a container of said material received in said seat portions, a post affixed to said base to extend centrally through the container, releasable clamping means on the outer end of said post for clamping the container in seated relation between said base and cap, said base having a wall portion provided with an extrusion orifice extending from the interior of said base to the exterior thereof, valve means in said base adapted to open and close said extrusion orifice with respect to the interior of the container, a piston operable in the container, manually operable control means, and means actuated by said control means for urging said piston to apply pressure against material in the container and simultaneously opening said valve means, thereby to dispense a predetermined amount of the material through said extrusion orifice.

*13. A soap or like paste dispenser, comprising a relatively fixed base having an upwardly presented peripheral seat portion, a container for the paste having an opening in at least one end, means for releasably securing said container with said one end thereof downwardly and non-rotatably seated on said seat portion of the base, pressure means operable against paste in said container, control means including a shiftable member for actuating said pressure means progressively to apply pressure to the paste, said base having an extrusion opening means therein for passage therethrough of paste exteriorly from the container and received through said one opening thereof, valve means including relatively movable closure parts for opening and closing said extrusion opening means to said passage of paste exteriorly, seat means in said base and an element shiftable in said seat means by operation of said control means in synchronism with shifting of said shiftable member, means actuated by said relative movement of said element for relatively moving said relatively movable closure parts between valve-opening and valve-closing positions thereof, said element thereby being shiftable by said control means in synchronism with application of said pressure to the paste to actuate said movable closure parts to valve-opening position thereof for a predetermined length of time to dispense paste from the container.*

*14. A soap or like paste dispenser, comprising a relatively fixed base having a seat portion, a shaft fixed to said base to extend outwardly of said seat portion, a sleeve rotatably received on said shaft, means for retaining said sleeve against axial movement on said shaft, a container for the paste having an opening at one end, said one end of the container being received in said seat portion, a piston threaded on said sleeve to be slidable within the container and adapted to be held against rotation therein as by pressure against paste in the container, control means operable to rotate said sleeve progressively in one direction and thereby by screw action between said sleeve and said piston progressively move said piston axially against the paste to apply pressure thereto, said base having an extrusion opening means therein for passage therethrough of paste exteriorly from the container, valve means including relatively movable closure parts for opening and closing said extrusion opening means to said passage of*

*paste exteriorly, seat means in said base and an element operable in said seat means by operation of said control means when said pressure is applied, means actuated by said relative movement of said element for relatively moving said relatively movable closure parts between valve-opening and valve-closing positions thereof, said element thereby being shiftable by said control means in synchronism with application of said pressure to the paste to actuate said movable closure parts to valve-opening position thereof for a predetermined length of time to dispense paste from the container.*

*15. A soap or like material dispenser, comprising a relatively fixed base having a peripheral seat portion, said base being adapted to have a peripheral end of a container of said material received in said seat portion, a post affixed to said base to extend centrally through the container, said base having extrusion opening means for passage therethrough of material exteriorly of the container, valve means in said base adapted to open and close said extrusion opening means with respect to the interior of the container, a piston operable in the container, manually operable control means for urging said piston to apply pressure against material in the container and simultaneously opening said valve means, thereby to dispense a predetermined amount of the material through said extrusion opening means, a threaded sleeve rotatably received on said post, and means on said post for retaining said sleeve against axial movement thereon, said sleeve being rotatable on said post and said piston being in threaded connection on said threaded sleeve, said control means being operable to rotate said sleeve whereby through said threaded connection said piston is urged to apply said pressure to the material.*

*16. A soap or like material dispenser, comprising a relatively fixed base having a peripheral seat portion, said base being adapted to have a peripheral end of a container of said material received in said seat portion, a post affixed to said base to extend centrally through the container, said base having extrusion opening means for passage therethrough of material exteriorly of the container, valve means in said base adapted to open and close said extrusion opening means with respect to the interior of the container, a piston operable in the container, manually operable control means for urging said piston to apply pressure against material in the container and simultaneously opening said valve means, thereby to dispense a predetermined amount of the material through said extrusion opening means, a threaded sleeve rotatably received on said post, and means on said post for retaining said sleeve against axial movement thereon, said sleeve being rotatable on said post and said piston being in threaded connection on said threaded sleeve, said control means being operable to rotate said sleeve, whereby through said threaded connection said piston is urged to apply said pressure to the material, said sleeve having an unthreaded reduced portion at the inner end thereof in which said piston is disengaged from the threaded portion of the sleeve and thereby to relieve the pressure of the piston.*

References Cited in the file of this patent or the original patent

UNITED STATES PATENTS

| | | |
|---|---|---|
| 825,136 | Kurrell | July 3, 1906 |
| 1,075,099 | Gruenttner | Oct. 7, 1913 |
| 1,084,537 | Clark | Jan. 13, 1914 |
| 1,300,183 | McLaughlin | Apr. 8, 1919 |
| 1,359,116 | Skelly | Nov. 16, 1920 |
| 1,598,970 | Kasper | Sept. 7, 1926 |
| 1,761,875 | Cordell et al. | June 3, 1930 |
| 2,080,343 | Smith | May 11, 1937 |
| 2,349,726 | Holler | May 23, 1944 |
| 2,404,119 | Zanolli | July 16, 1946 |